United States Patent [19]

McCleery

[11] 4,447,846

[45] * May 8, 1984

[54] COMPUTER ENVIRONMENT PROTECTOR

[76] Inventor: Winston T. McCleery, 4920 Cottage Hill Rd., Suite 5, Mobile, Ala. 36609

[*] Notice: The portion of the term of this patent subsequent to Apr. 27, 1999 has been disclaimed.

[21] Appl. No.: 320,569

[22] Filed: Nov. 12, 1981

Related U.S. Application Data

[63] Continuation-in-part of Ser. No. 156,342, Jun. 4, 1980, Pat. No. 4,327,397.

[51] Int. Cl.³ .................. H02H 3/20; H02H 3/24
[52] U.S. Cl. ................................ 361/90; 361/104; 361/91; 361/92
[58] Field of Search .................. 361/90, 91, 92, 103, 361/111, 114, 127, 194, 104; 340/628

[56] References Cited

U.S. PATENT DOCUMENTS

| | | |
|---|---|---|
| 2,597,185 | 5/1952 | Roeding et al. . |
| 2,832,900 | 4/1958 | Ford . |
| 3,037,151 | 5/1962 | Cimerman et al. . |
| 3,109,981 | 11/1963 | Muchnick . |
| 3,124,738 | 3/1964 | Smith et al. . |
| 3,167,685 | 1/1965 | Bade et al. . |
| 3,188,452 | 6/1965 | Asbury . |
| 3,522,482 | 8/1970 | Thompson . |
| 3,563,048 | 2/1971 | Barry ............................. 361/22 X |
| 3,603,806 | 9/1971 | Hitzke ............................ 361/22 X |
| 3,795,842 | 3/1974 | Kovacs . |
| 3,958,164 | 5/1976 | Hess ............................... 361/92 X |
| 4,020,395 | 4/1977 | Erickson et al. . |
| 4,023,071 | 5/1977 | Fussell . |
| 4,064,546 | 12/1977 | Domanski . |
| 4,068,279 | 1/1978 | Byrnes . |
| 4,086,643 | 4/1978 | Jacobs . |
| 4,137,556 | 1/1979 | Sessa . |
| 4,146,803 | 3/1979 | Kuwabara ..................... 340/628 X |
| 4,152,743 | 5/1979 | Comstock . |
| 4,171,533 | 10/1979 | Schrader . |
| 4,174,530 | 11/1979 | Kresge et al. . |
| 4,327,397 | 4/1982 | McCleery ........................ 361/92 X |

OTHER PUBLICATIONS

IBM Technical Disclosure Bulletin vol. 20, No. 9, Feb. 1978, Ov/Uv Detection Circuitry by R. P. Chrisfield et al., pp. 3589–3590.

*Primary Examiner*—Reinhard J. Eisenzopf
*Attorney, Agent, or Firm*—Cushman, Darby & Cushman

[57] ABSTRACT

A computer power/temperature protector is provided. A control and disconnect circuit is responsive to a power interruption to disconnect power from a computer to which the protector unit is connected in-line, and thereafter responsive to a reset signal to connect power to the computer. A power interruption is obtained automatically when a voltage failure occurs on the power cable to the computer. A thermostatic switch also automatically interrupts power when the ambient temperature of the room in which the computer or other load is located exceeds an adjustable pre-set level. A power emergency disconnect switch is provided for manually interrupting power. Furthermore, the present invention provides at least one varistor for shunting transient voltages. The varistors are automatically connected to the power lines of the cable when the apparatus is manually reset to supply power to the computer.

8 Claims, 4 Drawing Figures

COMPUTER ENVIRONMENT PROTECTOR

This application is a continuation-in-part of my earlier copending application Ser. No. 156,342 filed June 4, 1980, now U.S. Pat. No. 4,327,397.

The present invention relates to manually resettable automatic protective apparatus for a computer and more particularly to apparatus for insertion in a computer power cable to protect the associated computer from power transients, excessive ambient temperatures, detected smoke, air conditioning malfunctions, malfunctions of the environment protector itself and other potential emergency conditions.

A number of voltage/current sensitive control circuits, temperature-sensitive switch circuits, and transient suppression circuits are found in the prior art. Generally they are intended for specific applications.

In the category of voltage/current sensitive supply switching circuits, U.S. Pat. No. 3,037,151, issued to Cimerman et al on May 29, 1962, discloses a voltage monitoring circuit for interrupting the power being supplied to a plurality of power supplies when the ratio of the output voltages from those power supplies sufficiently varies from a predetermined value. An actuating coil of a normally-closed relay switch opens that switch to interrupt the power. U.S. Pat. No. 3,167,685, issued to Bade et al on Jan. 26, 1963, discloses a computer protection circuit that monitors the output of a plurality of power supplies and, in the event of a failure of any one or more of the power supplies quickly removes all power being supplied from them to the computer. Each power supply includes an overload relay. In the event of a power supply failure, the computer protection circuit short-circuits the outputs of the power supplies, thereby overloading the power supplies. The overload relay of each power supply responds by opening the associated power supply line, which remains open until the relay is reset.

In the category of temperature sensitive switch circuitry, U.S. Pat. No. 2,597,185, issued to Roeding et al on May 20, 1952, discloses a self-protected distribution transformer having two bimetal elements responsive both to the temperature of the transformer oil and to the current flowing in the transformer secondary circuit. Either bimetal element is effective to trip a breaker, thereby interrupting the current flow through both poles of the breaker and completely disconnecting the secondary circuit from the distribution circuit supplied from the transformer.

In the category of transient protection circuitry, U.S. Pat. No. 4,023,071, issued to Fussell on May 10, 1977, U.S. Pat. No. 4,068,279, issued to Byrnes on Jan. 10, 1978, and U.S. Pat. No. 4,152,743, issued to Comstock on May 1, 1979 disclose varistors in suitable circuits for providing transient voltage protection. The patent to Comstock further discloses certain temperature sensitive devices in series with a respective varistor. These devices conduct when the current therethrough or the temperature thereof is below a certain level, and do not conduct when the current therethrough or the temperature thereof exceeds a certain level.

None of such prior art, however, provides a substantially complete solution to the unique problems presented by the need to fully protect a computer from its environment. This invention does so, in part, by providing a simply installed apparatus for protecting a computer system from harmful power line voltage transients, and for cutting off power to the computer in the event of excessive computer room ambient temperature detected smoke in the ambient atmosphere, air conditioning malfunctions (and other such environmental conditions if desired), source power failure, and other emergency conditions including malfunction of the environment protector itself. It also provides for power cut-off due to such conditions as excessive temperature and source automatic power failure. Potential emergency conditions, which require operator discretion, on the other hand do not cause automatic power cut-off; rather, the capability for manual cut-off is provided to cover these situations. Furthermore, restoration of power to the computer does not occur automatically with power failure recovery or mere correction of the initially detected adverse condition. Restoration of power requires the discretion of the computer operator, and therefore is manually effected. This invention is also compatible with a wide variety of computer systems, particularly those powered by conventional one or three phase A.C. supplies. The present invention is quickly, easily, and inexpensively installed in the power cable of the computer in proximity thereto. No modification to or contact with the computer is necessary.

According to the present invention, power is cut-off from the computer automatically in response to electrical line power failure, excessive ambient air temperature, detected atmospheric smoke, air conditioning malfunction and malfunctions of the environment protector itself as well as manually in response to undesirable potential emergency conditions and other conditions for which automatic power interruption is not provided. The apparatus is manually reset. Undesirable transient voltage conditions are also moderated in the power supplied to the computer.

In one embodiment of the present invention, all power lines in the power cable to the computer are controllably rendered non-conductive in response to an interruption in the voltage being supplied to a control relay. The voltage interruption may be obtained in a number of ways. The control relay itself is sensitive to power failure occurring on at least one of the power lines to controllably render all power lines non-conductive. Temperature sensing means also automatically effects a voltage interruption in response to deviation in the sensed temperature from a preselected temperature range. A voltage interruption may be manually effected in response to unanticipated, disregarded, or otherwise unprovided-for conditions by means of a suitable switch. Once the cause of the voltage interruption is removed, a current flow through the control relay is again established by operation of suitable switching means. Voltage transients appearing on all power lines are also shunted by suitable means to protect the computer from this additional kind of undesirable condition.

In a second improved embodiment, the need for a separate control relay is eliminated. At the same time, provisions are made for automatic shut down of the computer if smoke is detected. The associated air conditioner may also be automatically shut down with the computer if desired in this embodiment and then independently restarted. This improved second embodiment also automatically shuts down the computer (and air conditioning) if the protective circuit itself malfunctions.

These as well as other objects and advantages of this invention will be better understood and appreciated in view of the following detailed description taken in conjunction with the accompanying drawings wherein.

Figure 1:
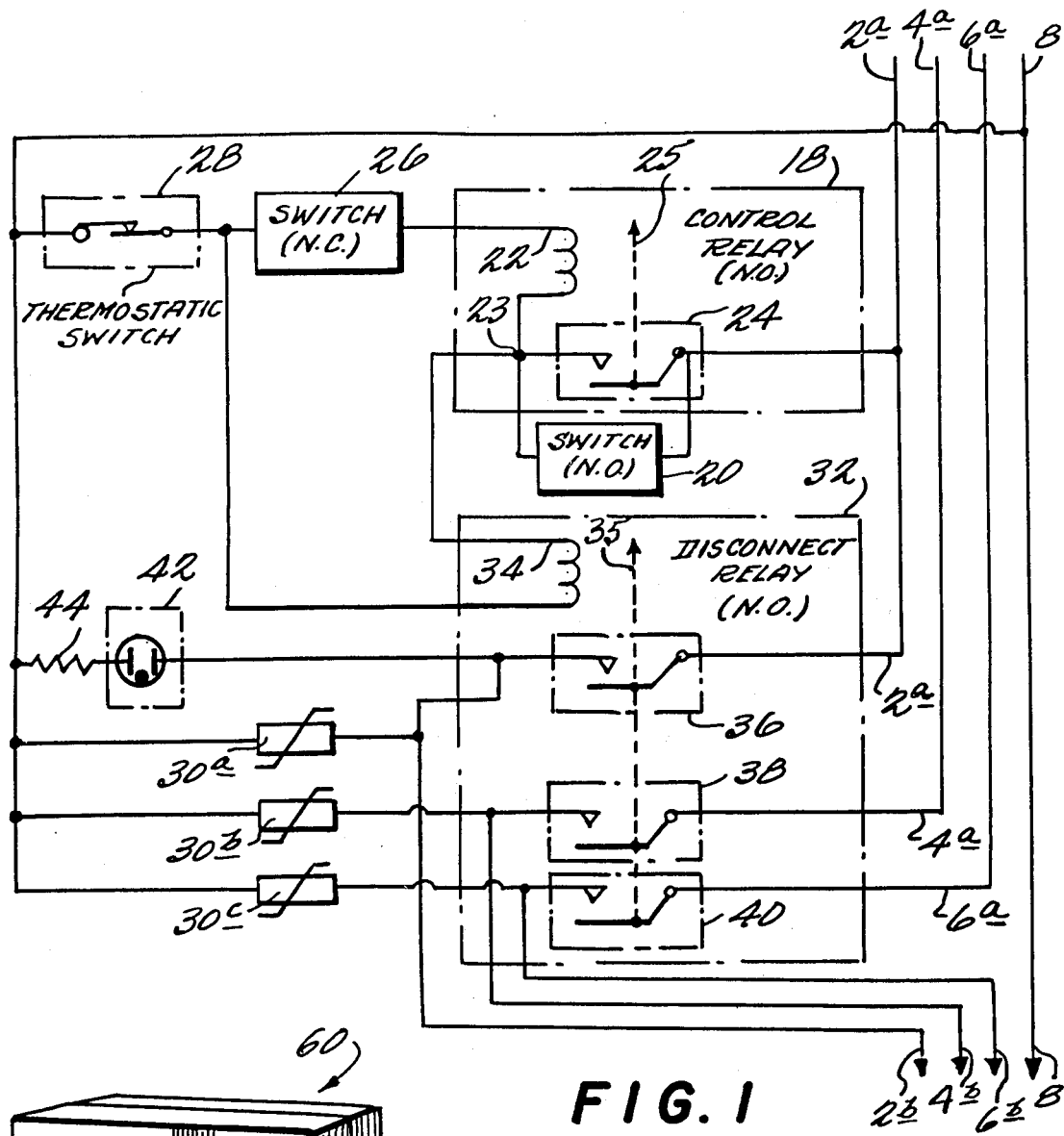
FIG. 1 is a schematic diagram of a first embodiment of a protector circuit in accordance with the present invention.

The computer power/temperature protector according to the present invention is suitable for insertion into the power cable of a computer and located in the environment of the computer to protect automatically against such conditions as power failure, power transients, and high ambient temperature; and to provide manual emergency power shutdown capability for disregarded, unanticipated or otherwise unprovided for conditions. The first embodiment of protector circuitry, shown schematically in FIG. 1, is suitable for use in a one or three-phase power system. A power cable comprises lines 2 (2a and 2b), 4 (4a and 4b), 6 (6a and 6b), and 8. Lines 2a, 4a and 6a convey power from a power generation system (not shown), while line 8 is a grounded (or neutral) conductor. Lines 2b, 4b and 6b are connected to the computer (not shown) for conveying power thereto, subject to the influence of the protector unit. The connection and disconnection of the input lines 2a, 4a and 6a to the output lines 2b, 4b and 6b is effected by the disconnect relay 32, which is controlled by control elements in the protector unit, as described below. Line 8 is unswitched.

In the first embodiment, the control elements are a control relay 18, switches 20 and 26 and a thermostatic switch 28. The disconnect relay 32 is suitably controlled by the control relay 18. Relay 18 is preferably a normally open relay having a single set of "control" electrical contacts 24 that are moved by an armature 25 and its associated operating coil 22, as is well known in the art. The normally open switch 20 is connected across the contacts 24. One of the contacts 24 receives power preferably from a preselected one of the input power lines, line 2a as shown in FIG. 1, and the other contact connects to the line 8 through a series connection of the coil 22, the normally closed switch 26, and the normally closed thermostatic switch 28.

By this arrangement, when the switch 20 is depressed, the connection across the normally open contacts 24 is closed, thereby connecting node 23 to line 2a, energizing the coil 22, and closing the contacts 24. Although the switch 20 is thereafter released, the voltage supplied by line 2a continues to be applied to the coil 22 through the closed contacts 24. Node 23 remains connected to line 2a. An interruption of voltage being applied to coil 22 (hereinafter referred to as "voltage interruption"), however, will de-energize the coil 22 thereby opening the contacts 24 and disconnecting node 23 from the line 2a. An interruption of voltage may be caused by any one of several conditions, as will be appreciated. Subsequent restoration of voltage across the control relay 18 will not energize coil 22 until switch 20 is depressed, as described above.

It will be appreciated that node 23 will controllably assume one of two states, depending on whether it is connected or unconnected to line 2a. These states are advantageously used for control purposes insofar as the disconnect relay 32 is connected to node 23, and to the line 8 through the thermostatic switch 28. The disconnect relay 32 comprises a relay coil 34 and three sets of normally open "power" electrical contacts 36, 38 and 40 which are moved concurrently by an associated armature 35, as is well known in the art. When the switch 20 is momentarily depressed and released, the voltage of line 2a is made available at node 23 (assuming the switch 26 and thermostatic switch 28 to be closed). This voltage is applied to the coil 34, energizing coil 34 to close the contacts 36, 38 and 40. The contacts 36, 38 and 40 thereby connect the lines 2a, 4a and 6a provided at the input side thereof to the respective lines 2b, 4b and 6b provided at the output side thereof for supplying power to the associated computer or other loads. When a voltage interruption occurs, line 2a is disconnected from node 23. Coil 34 is de-energized and contacts 36, 38 and 40 open. Lines 2a, 4a and 6a are thereby disconnected from lines 2b, 4b and 6b. Line 8 is not switched.

Voltage transient protection is provided by the varistors 30a, 30b and 30c, which are connected between the line 8 and the output side of the contacts 36, 38 and 40, respectively. As is known, a transient is a quantity of voltage in excess of normal supply which can cause extensive damage to a computer or other sensitive electrical or electronic load exposed to them. For example, if the normal supply voltage is 208 volts, it is not uncommon to experience power line transients of as much as several thousand volts. The varistors 30a, 30b and 30c suitably shunt each transient over-voltages to line 8. Transient over-voltages, even those of microsecond duration, are thereby clamped to approximately twice the normal voltage level, provided the transient voltages are not immediately repetitive. Suitable varistors include type number V130LA20A, manufactured by General Electric Corporation. A neon light 42 and a current limiting resistor 44 are connected in series between a preselected one of the output terminals of the contacts of the disconnect relay 32, preferably the output terminal of contact 36 associated with line 2b, and line 8 to provide a visual indication that power is being supplied to the computer.

According to the present invention, excessive temperature in the environment of the computer is one condition that automatically will cause a voltage interruption. The protector unit according to the present invention is provided with a thermostatic switch 28 which is sensitive to ambient air temperature. When the ambient air temperature reaches a cut-off level pre-set by the user, the normally closed thermostatic switch 28 opens, thereby de-energizing control relay 18 and disconnect relay 32 to disconnect lines 2a, 4a and 6a from the lines 2b, 4b and 6b. Power is effectively removed from the computer.

To reapply power, the protector unit must be manually reset. To prevent the protector unit from being reset while ambient temperature remains near or above the pre-set level, however, thermostatic switch 28 remains open until the ambient room temperature returns to approximately 5° F. below the cut-off level. As a result, all circuits from the power line 2a to the line 8 will remain open until the thermostatic switch 28 senses a suitably reduced temperature and achieves its normally closed condition. At this time, the thermostatic switch 28 will complete the circuit from the coil 22 of control relay 18 (assuming switch 26 is closed) and from the coil 34 of disconnect relay 32 to the line 8. Contacts 24 of the control relay 18, however, remain open. When switch 20 thereafter is depressed to reset the protector circuitry, the potential at node 23 is raised to the potential of line 2a, thereby energizing the coils 22 and 34 of the control relay 18 and disconnect relay 32, respectively, to provide power at the output lines 2b, 4b and 6b, as described above.

A failure of power on line 2a is another condition that automatically will cause a voltage interruption to occur. When power on line 2a fails, even momentarily, the coil 22 is de-energized. As a result, the contacts 24 open, and subsequent restoration of power will not re-energize the relay 22 unless the switch 20 is depressed to reset the protector unit.

Also according to the present invention, a voltage interruption may be manually effected in response to emergency conditions by means of switch 26. Switch 26 is a normally closed-type switch for maintaining a current path from node 23 through the coil 22 of the control relay 18. In this way, the disconnect relay 32 can be energized when the switch 20 is depressed. When an emergency arises requiring manual disconnection of power, the switch 26 is depressed momentarily to de-energize coil 22 of the control relay 18. Accordingly, power is removed from the node 23 and coil 34 of the disconnect relay 32, and the contacts 36, 38 and 40 open to disconnect lines 2a, 4a and 6a from the lines 2b, 4b and 6b. Power is removed from the computer system, and is restored by resetting the protector unit by manually depressing switch 20, as described above.

Typical specifications for the protector unit are as follows. The input voltage is between 200 and 260 volts, single or three-phase. The power capacity to an external load is 15 KVA. The control circuitry operating voltage is between 108-130 volts. The control drop out level is 190 volts or less. The thermostatic switch cut-off temperature is adjustable between 70° F. and 90° F.

Figure 2:
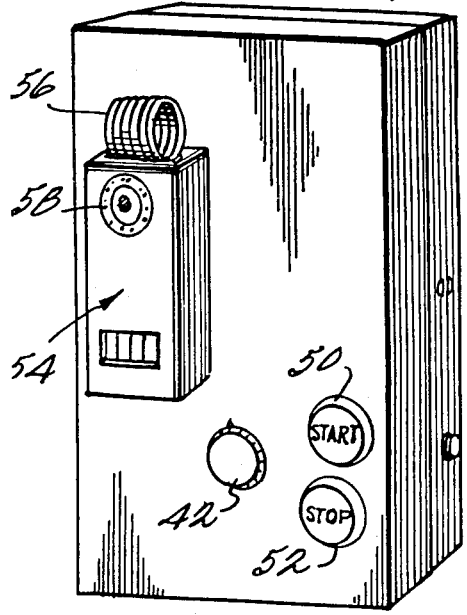
FIG. 2 is a perspective view of the embodiment of FIG. 1 suitable for wall mounting.

FIG. 2 shows the first embodiment of the protector unit suitable for installation at a computer site. Installation is accomplished by a qualified electrician in approximately 1-2 hours. The protector unit is contained in a suitable cabinet 60 that is mounted on a wall near the computer, approximately 4-5 feet above floor level. A start button 50 associated with the switch 20 is provided for resetting the protector circuitry, and a stop button 52 associated with the switch 26 is provided to emergency cut-off the power supply to the computer. The neon light 42 is mounted on the front of the protector unit panel as a visual indication that power is being supplied to the computer, as aforementioned. A housing 54 for the thermostatic switch 28 is prominently visible on the front panel of cabinet 60, a sensing coil 56 being provided to sense the ambient air to set the high temperature cut-off level.

It will be understood that the above description of the first embodiment is an illustrative embodiment of the present invention, and that the invention is not limited to the specific form shown. Modifications may be made in the design and arrangement of the elements without departing from the spirit and scope of the invention as expressed in the appended claims. For example, any device that suitably shunts voltage transients may be used in place of the varistors 30a, 30b and 30c, respectively, without departing from the spirit and scope of the present invention. Furthermore, any suitable normally-closed sensor-controlled switch may be connected in place of or in addition to the thermostat 28 to provide input power control based on other parameters, such as humidity and/or smoke detection.

Figure 3:
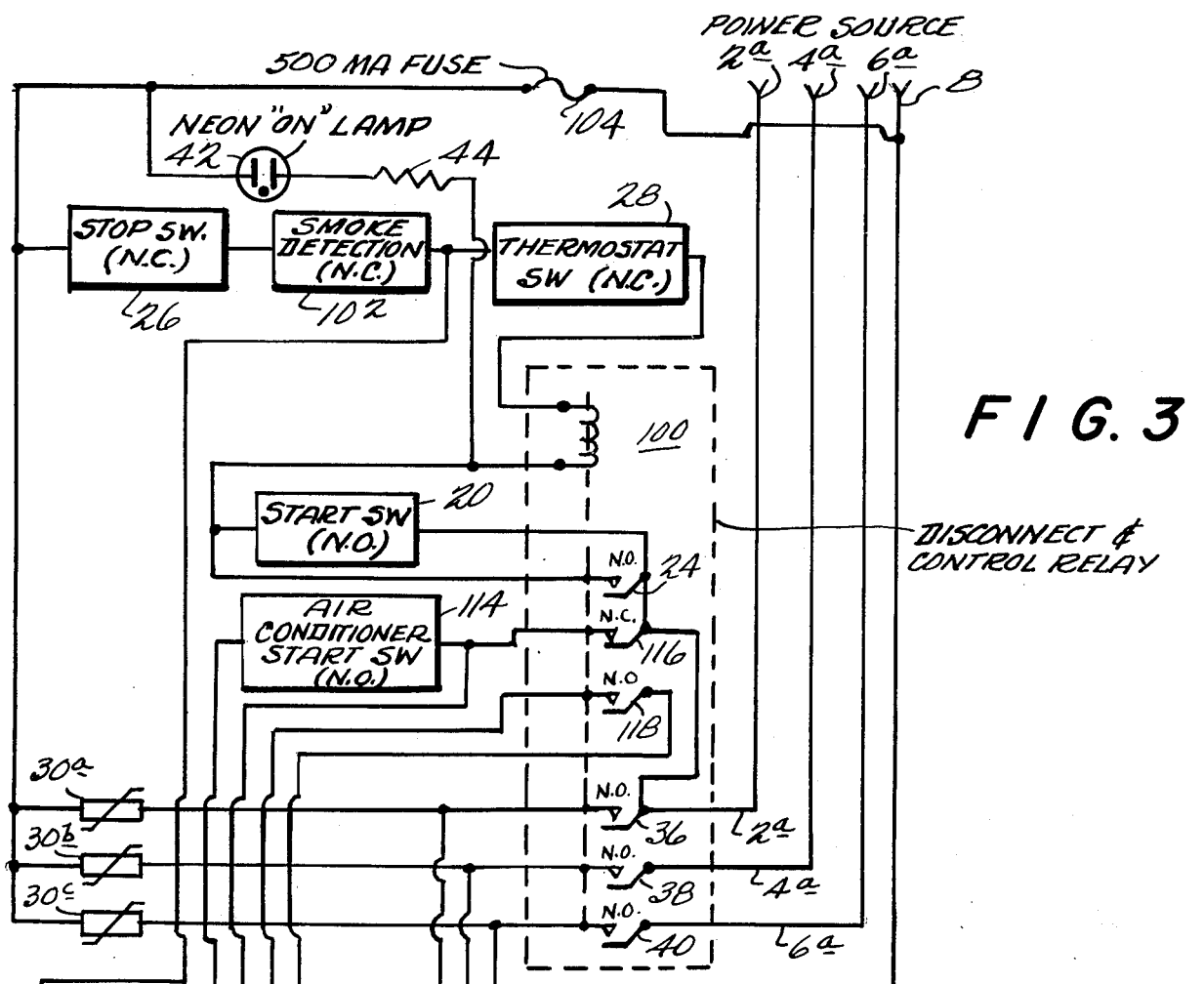
FIG. 3 is a schematic diagram of a second improved embodiment of a protector circuit in accordance with the present invention.
Figure 4:
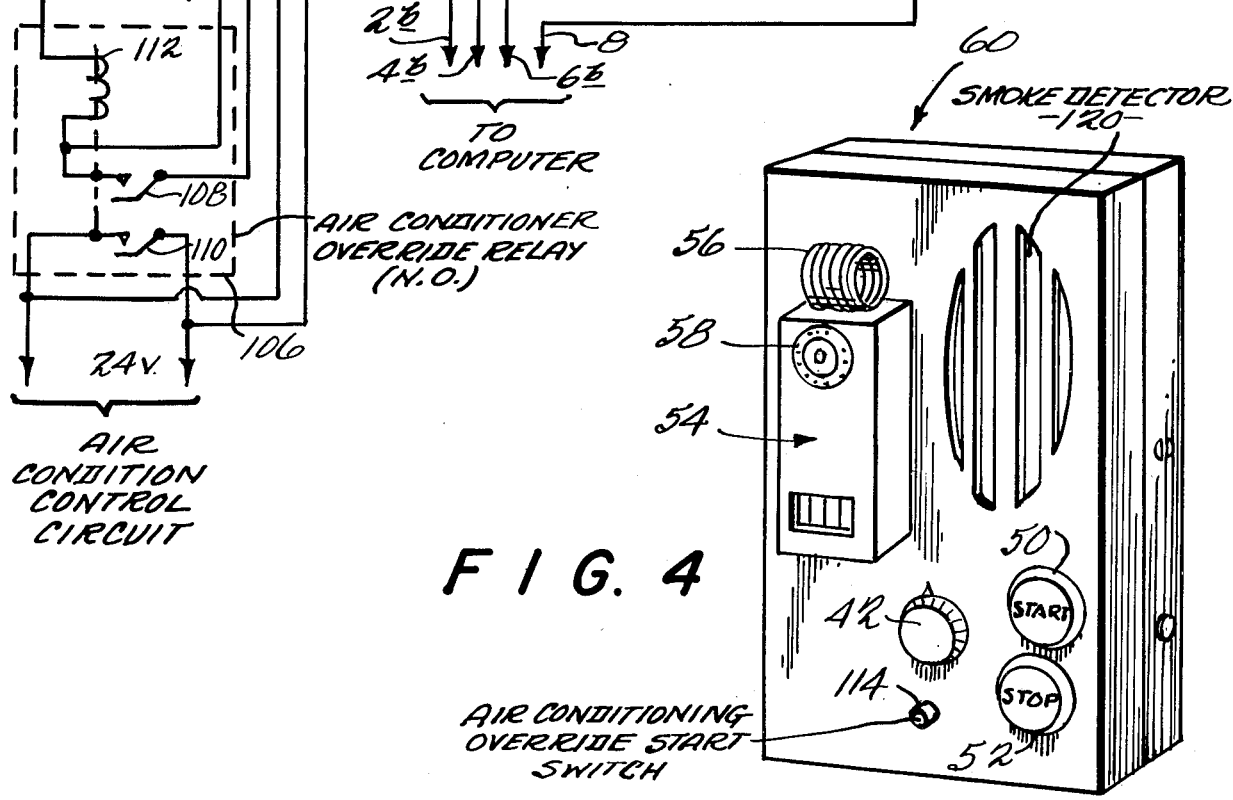
FIG. 4 is a perspective view of the embodiment of FIG. 3 suitable for wall mounting.

A second improved embodiment of this invention is shown at FIGS. 3 and 4. Identical or analogous elements in this improved embodiment have been labeled with the same reference numerals in FIG. 3 as in the first embodiment shown at FIG. 1. New elements carry new three digit reference numerals. In addition, it will be noted that some of the previous elements have been eliminated, simplified rearranged and/or functionally combined.

For example, the separate control relay 18 and its associated coil 22 have been eliminated. The control contacts 24 are now provided as a separate set of normally open contacts associated with a combined control and disconnect relay 100. As before, the control contacts 24 are used to latch the disconnect contacts 36, 38, 40 in their closed position. The latching circuit can, as before, be interrupted by momentary actuation of the normally closed stop switch 26 or the normally closed thermostat contacts 28. In addition, normally closed smoke detector contacts 102 are now provided for detecting smoke within the atmosphere of the computer's environment. If any of these three normally closed switches is momentarily actuated, the control and disconnect relay 100 will come unlatched thus disconnecting power from the computer. Once that has occurred, the only way power can be restored is for the normally closed tripped switch to once again become closed (i.e. by a suitable change in temperature or absence of smoke, etcetera) *and* for the start switch 20 to be manually actuated by the computer operator.

As previously explained, additional environmental condition detectors having normally closed contacts can be connected in series with the thermostat switch 28 and smoke detector switch 102 if protection for additional environmental conditions is desired.

As before, varistors 30a, 30b, 30c are provided for suppressing electrical transients in the power supplied to the computer. Neon lamp 42 and its associated resistor 44 are also provided and connected so as to provide a visual indication whenever the control and disconnect relay 100 is latched to provide power to the computer.

In the improved embodiment of FIG. 3, a fuse 104 (500 milliamps in the exemplary embodiment) is provided in series with the other normally closed condition detector switches. Accordingly if the protective circuitry of FIG. 3 should itself malfunction for some reason in a way that causes excessive current to be drawn, it will automatically unlatch the relay 100 and remove power from the computer.

An optional (but preferred) feature of the improved embodiment shown in FIG. 3 may be provided to control the air conditioner circuit which, in turn, controls air conditioning of the computer environment. If this feature is desired, a separate air conditioner override relay 106 having a pair of normally open contacts 108, 110 is provided. Its control coil 112 is connected in series with the smoke detector contacts 102, the stop switch 26, a normally open air conditioner override start switch 114 normally closed contacts 116 of relay 100 and with the fuse 104 across power lines 2a, 8. Contacts 108 are connected in a latching circuit for relay 106 such that whenever the start switch 114 is momentarily depressed, the air conditioner relay 106 is latched (assuming fuse 104 and contacts 26, 102 and 116 are closed) so as to complete the 24 volt air conditioner control circuit connected in series with contacts 110. If relay 100 is for any reason latched, the latching circuit for relay 106 is delatched (via opened contacts 116).

However another set of normally open contacts 118 on relay 100 is connected in parallel with contacts 110 so as to positively insure activation of the air conditioning control circuit whenever power is supplied to the computer. On the other hand, if for any reason relay 100 is thereafter delatched, the air conditioner control circuit will automatically be deactivated until the air conditioner override start switch 114 is manually depressed (assuming power is again present from the power source). Similarly, since the latching circuit for relay 106 includes the stop switch 26, smoke detector 102 and fuse 104, the air conditioning relay 106 is automatically delatched whenever any of these becomes an open circuit. It should be noted that the thermostat 28 is not directly in the latch circuit of relay 106 so that the air conditioning may be independently restarted even though the temperature is not yet sufficiently below the set point to cause closure of its contacts. This air conditioning control feature provides energy conservation and, in addition, if high temperature is detected so as to turn off the computer, this is an indirect indication that the air conditioner is malfunctioning anyway and that it should therefore be turned off until corrective action can be taken.

The external appearance of the improved embodiment shown in FIG. 3 is quite similar to the first embodiment as may be seen by inspection of FIG. 4. The only changes are the addition of the air conditioning override start switch 114 smoke detecting apparatus which can be mounted remotely at any desired location in the computer room or mounted directly with the protective unit itself as shown at 120. In the latter event, at least a portion of the smoke detecting apparatus is exposed to the computer room environment.

Accordingly, using the second presently preferred improved embodiment of the invention, the computer is protected by disconnecting its primary power whenever one or more of the following conditions occurs:
1. primary power is temporarily lost
2. computer room temperature reaches a preset level (which may be caused by an air conditioner malfunction, for example)
3. smoke is detected within the computer room
4. the manual disconnect switch is activated for any desired reason
5. the protective circuit itself fails or malfunctions in a way which causes it to draw excessive electrical current.

In addition, to provide energy conservation and to also automaticaly discontinue operation of the computer and air conditioning equipment in the event of an air conditioning malfunction, the air conditioner override relay 106 may be added to provide still further advantages. At the same time, if the air conditioning equipment itself is fully operational, it will normally be desired to continue operation of the air conditioning equipment even though the computer is not running. Accordingly, a separate manual start switch 114 is provided which permits the air conditioning equipment to be energized independently of the computer.

The improved protective circuitry also reduces the quantity and/or magnitude of electrical transients or spikes presented to the computer from ordinary power line sources. It prevents restoration of power to the computer unless consciously restored by manual activation of start switch 20. As previously explained, such manual activation is not possible until the temperature drops 5 or more degrees below the cut-off level set into the thermostat. In addition, the protector circuitry cannot be reset manually until the room is completely cleared of all smoke. The circuitry is preferably completely self-contained and even protects against its own malfunctions by the placement of fuse 104 in the latching circuits.

While only two exemplary embodiments of this invention have been described in detail, those ordinarily skilled in the art will realize that the many advantages and novel features of the applicant's invention can be maintained even though the exemplary embodiments are modified in many respects. All such modifications are intended to be within the scope of the following appended claims.

What is claimed is:

1. Protective apparatus for protecting an electronic computer powered by electrical power lines from adverse conditions in its immediate environment, said protective apparatus comprising:
   a manual shut-down switch,
   temperature sensing means;
   smoke detecting means;
   excess current detecting means connected to monitor the electrical current consumed by said protective apparatus;
   input power terminals connectable to said electrical power lines;
   output power terminals connectable to power said electronic computer;
   electrical disconnect means connected between said input power and output power terminals, to said manual shut-down switch, to said temperature sensing means and to said smoke detecting means for controllably disconnecting said computer from said power lines in response to any of the following conditions;
   (a) a temporary loss of electrical power on said power lines,
   (b) the ambient temperature of air in the computer's immediate environment exceeds a present temperature,
   (c) smoke is detected in the computer's immediate environment,
   (d) said manual shut-down switch is activated,
   (e) excessive electrical current is consumed by said protective apparatus;
   a manual start-up switch connected to said electrical disconnect means for causing said computer to be connected to said power lines in response to manual activation of the start-up switch in the absence of any of the aforestated conditions;
   air conditioner control means including electrical terminals connectable to control the operation of an air conditioner servicing the immediate environment of the computer;
   said air conditioner control means being connected to automatically stop a connected air conditioning system when the computer is automatically disconnected from the power lines by said protective apparatus; and
   air conditioner override means connected to permit independent start-up and operation of the connected air conditioning system when manually activated.

2. Protective apparatus as in claim 1 wherein said excess current detecting means comprises a fuse connected in series with said temperature sensing means and said smoke detecting means.

3. Protective apparatus as in claim 2 wherein said electrical disconnect means comprises a control and disconnect relay having an electromagnetic coil connected in series with said manual start-up switch, said manual shut-down switch, said smoke detecting means, said temperature sensing means and said fuse.

4. Protective apparatus as in claim 3 wherein said control and disconnect relay includes at least one normally open set of contacts connected in a latching circuit across said manual start-up switch.

5. Protective apparatus as in claim 4 further comprising a varistor connected to said electrical disconnect means so as to be placed across said power lines when they are connected to said output terminals.

6. Protective apparatus as in claim 3 wherein said air conditioner control means includes an electromagnetic relay having a coil connected in series latching circuit including said smoke detecting means, said manual shut-down switch, said fuse and normally closed contacts of said control and disconnect relay.

7. Protective apparatus as in claim 6 wherein said control and disconnect relay includes normally open contacts electrically connected in parallel across said electrical terminals of the air conditioner control means.

8. Protective apparatus for protecting an electronic computer powered by electrical power lines from adverse conditions in its immediate environment, said protective apparatus comprising:
   a manual shut-down switch;
   plural environmental condition detecting means;
   input power terminals connectable to said electrical power lines;
   output power terminals connectable to power said computer;
   electrical disconnect means connected between said input power and output power terminals, to said manual shut-down switch, and to said plural environmental condition detecting means for controllably disconnecting said computer from said power lines in response to a detected adverse environmental condition or activation of said manual shut-down switch;
   a manual start-up switch connected to said electrical disconnect means for causing said computer to be connected to said power lines in response to manual activation of the start-up switch in the absence of any detected adverse environmental condition and in the absence of activation of said manual shut-down switch;
   air conditioner control means including electrical terminals connectable to control the operation of an air conditioner servicing the immediate environment of the computer;
   said air conditioner control means being connected to automatically stop a connected air conditioning system when the computer is automatically disconnected from the power lines by said protective apparatus; and
   air conditioner override means connected to permit independent start-up and operation of the connected air conditioning system when manually activated.

* * * * *